(12) United States Patent
Fuhse

(10) Patent No.: US 9,297,941 B2
(45) Date of Patent: Mar. 29, 2016

(54) OPTICALLY VARIABLE ELEMENT, IN PARTICULAR SECURITY ELEMENT

(75) Inventor: Christian Fuhse, Otterfing (DE)

(73) Assignee: Giesecke & Devrient GmbH, Munich (DE)

( * ) Notice: Subject to any disclaimer, the term of this patent is extended or adjusted under 35 U.S.C. 154(b) by 0 days.

(21) Appl. No.: 14/232,960

(22) PCT Filed: Jul. 19, 2012

(86) PCT No.: PCT/EP2012/003059
§ 371 (c)(1),
(2), (4) Date: Jan. 15, 2014

(87) PCT Pub. No.: WO2013/010672
PCT Pub. Date: Jan. 24, 2013

(65) Prior Publication Data
US 2014/0160568 A1  Jun. 12, 2014

(30) Foreign Application Priority Data
Jul. 21, 2011 (DE) .......................... 10 2011 108 242

(51) Int. Cl.
*B42D 25/00* (2014.01)
*G02B 5/28* (2006.01)
(Continued)

(52) U.S. Cl.
CPC ............... *G02B 5/285* (2013.01); *B42D 25/00* (2014.10); *B42D 25/29* (2014.10); *G02B 5/26* (2013.01); *G02B 5/286* (2013.01)

(58) Field of Classification Search
CPC ................................ B42D 15/10; G02B 5/285

USPC .................................. 359/619, 618, 586, 580
See application file for complete search history.

(56) References Cited

U.S. PATENT DOCUMENTS

| 4,012,843 | A | 3/1977 | Harada et al. |
| 4,184,700 | A | 1/1980 | Greenaway |
| 4,484,797 | A | 11/1984 | Knop et al. |

(Continued)

FOREIGN PATENT DOCUMENTS

| AU | 738289 B2 | 9/2001 |
| AU | 2003283372 A1 | 6/2004 |

(Continued)

OTHER PUBLICATIONS

Fuhse, "Combination of Micro Mirrors and Thin Film Color Shift," 2014 Optical Document Security Conference, San Francisco, California, USA, Jan. 29-31, 2014, 8 pages.

(Continued)

Primary Examiner — Jordan Schwartz
Assistant Examiner — George G King
(74) Attorney, Agent, or Firm — Workman Nydegger

(57) ABSTRACT

An optically variable element, in particular a security element, has a transparent carrier layer, an at least partly transparent reflective layer formed on the carrier layer, and a transparent embedding layer formed on the reflective layer. The reflective layer is structured in a motif region such that the layer forms a multiplicity of partly transparent micromirrors which present a perceptible motif upon plan viewing of the motif region due to specular reflection of incident light. The refractive indices of the carrier and embedding layers differ in the visible spectrum by no more than 0.2 in order that the motif perceptible in plan view is not recognizable upon transmission viewing of the motif region.

18 Claims, 7 Drawing Sheets

(51) Int. Cl.
*G02B 5/26* (2006.01)
*B42D 25/29* (2014.01)

(56) References Cited

U.S. PATENT DOCUMENTS

| | | |
|---|---|---|
| 4,568,141 A | 2/1986 | Antes |
| 4,838,648 A | 6/1989 | Phillips et al. |
| 4,892,385 A | 1/1990 | Webster, Jr. et al. |
| 4,984,824 A | 1/1991 | Antes et al. |
| 5,032,003 A | 7/1991 | Antes |
| 5,101,184 A | 3/1992 | Antes |
| 5,105,306 A | 4/1992 | Ohala |
| 5,106,125 A | 4/1992 | Antes |
| 5,301,062 A | 4/1994 | Takahashi et al. |
| 5,335,113 A | 8/1994 | Jackson et al. |
| 5,428,479 A | 6/1995 | Lee |
| 5,770,120 A | 6/1998 | Kamihara et al. |
| 5,825,547 A | 10/1998 | Lee |
| 5,909,313 A | 6/1999 | Lee |
| 6,088,161 A | 7/2000 | Lee |
| 6,157,487 A | 12/2000 | Staub et al. |
| 6,226,127 B1 | 5/2001 | Dunn et al. |
| 6,342,969 B1 | 1/2002 | Lee |
| 6,870,678 B2 | 3/2005 | Tompkin et al. |
| 6,975,438 B2 | 12/2005 | Schilling et al. |
| 6,987,590 B2 * | 1/2006 | Phillips et al. .................... 359/2 |
| 7,106,516 B2 * | 9/2006 | Lotz et al. .................... 359/584 |
| 7,281,810 B2 | 10/2007 | Lee |
| 7,517,578 B2 | 4/2009 | Raksha et al. |
| 7,630,954 B2 | 12/2009 | Adamczyk et al. |
| 7,699,350 B2 | 4/2010 | Heim |
| 7,719,733 B2 | 5/2010 | Schilling et al. |
| 8,149,511 B2 | 4/2012 | Kaule et al. |
| 8,187,771 B2 | 5/2012 | Staub et al. |
| 8,400,495 B2 | 3/2013 | Kaule |
| 8,632,100 B2 | 1/2014 | Kaule et al. |
| 2001/0041307 A1 | 11/2001 | Lee et al. |
| 2004/0032659 A1 | 2/2004 | Drinkwater |
| 2004/0057113 A1 | 3/2004 | Tompkin |
| 2005/0068624 A1 | 3/2005 | Schilling et al. |
| 2005/0127663 A1 | 6/2005 | Heim |
| 2005/0179254 A1 | 8/2005 | Heim et al. |
| 2005/0270604 A1 | 12/2005 | Drinkwater |
| 2007/0183045 A1 | 8/2007 | Schilling et al. |
| 2007/0246933 A1 * | 10/2007 | Heim et al. .................... 283/98 |
| 2007/0291362 A1 | 12/2007 | Hill et al. |
| 2008/0160226 A1 | 7/2008 | Kaule et al. |
| 2008/0231976 A1 | 9/2008 | Commander et al. |
| 2008/0250954 A1 | 10/2008 | Depta et al. |
| 2008/0258456 A1 | 10/2008 | Rahm et al. |
| 2008/0259456 A1 | 10/2008 | Schilling et al. |
| 2009/0008923 A1 | 1/2009 | Kaule et al. |
| 2009/0091834 A1 | 4/2009 | Ryzi et al. |
| 2009/0162756 A1 | 6/2009 | Staub et al. |
| 2010/0001508 A1 | 1/2010 | Tompkin et al. |
| 2010/0045024 A1 | 2/2010 | Attner et al. |
| 2010/0177094 A1 | 7/2010 | Kaule et al. |
| 2010/0182221 A1 | 7/2010 | Kaule et al. |
| 2010/0194532 A1 | 8/2010 | Kaule |
| 2010/0208036 A1 | 8/2010 | Kaule |
| 2011/0012337 A1 * | 1/2011 | Heim .................... 283/94 |
| 2011/0018252 A1 | 1/2011 | Petry et al. |

FOREIGN PATENT DOCUMENTS

| | | |
|---|---|---|
| AU | 2009278275 | 2/2010 |
| CN | 1193299 A | 9/1998 |
| CN | 100534807 C | 9/2009 |
| CN | 100567022 C | 12/2009 |
| CN | 101610907 A | 12/2009 |
| CN | 101883826 A | 11/2010 |
| CN | 101959696 A | 1/2011 |
| CN | 102112896 A | 6/2011 |
| DE | 25 55 214 A1 | 6/1977 |
| DE | 195 06 880 A1 | 8/1996 |
| DE | 10129939 A1 | 1/2003 |
| DE | 10 2004 017 094 A1 | 11/2005 |
| DE | 10 2005 025 095 A1 | 12/2006 |
| DE | 10 2005 027 380 A1 | 12/2006 |
| DE | 102005061749 A1 | 7/2007 |
| DE | 102006016139 A1 | 10/2007 |
| DE | 102008013167 * | 9/2009 | ............... B44F 1/12 |
| DE | 102008046128 A1 | 3/2010 |
| EP | 0 105 099 A1 | 4/1984 |
| EP | 0 227 423 A2 | 7/1987 |
| EP | 0 330 738 A1 | 9/1989 |
| EP | 0 375 833 A1 | 7/1990 |
| EP | 0 429 782 A1 | 6/1991 |
| EP | 1547807 A2 | 6/2005 |
| EP | 1 580 020 A1 | 9/2005 |
| EP | 1 658 992 A1 | 5/2006 |
| JP | S57-208514 A | 12/1982 |
| JP | S59-12403 A | 1/1984 |
| JP | S60-8802 A | 1/1985 |
| JP | 2008-0 80 609 A | 4/2008 |
| WO | 90/07133 A1 | 6/1990 |
| WO | 90/08338 A1 | 7/1990 |
| WO | 91/03747 A1 | 3/1991 |
| WO | 93/18419 A1 | 9/1993 |
| WO | 94/28444 A1 | 12/1994 |
| WO | 97/16772 A1 | 5/1997 |
| WO | 97/19821 A1 | 6/1997 |
| WO | 97/34170 A2 | 9/1997 |
| WO | 98/20382 A1 | 5/1998 |
| WO | 98/23979 A1 | 6/1998 |
| WO | 98/53999 A1 | 12/1998 |
| WO | 99/65699 A1 | 12/1999 |
| WO | 00/13916 A1 | 3/2000 |
| WO | 01/80175 A1 | 10/2001 |
| WO | 02/06858 A2 | 1/2002 |
| WO | 03/068525 A1 | 8/2003 |
| WO | 2005/042268 A1 | 5/2005 |
| WO | 2006/013215 A1 | 2/2006 |
| WO | 2006/087138 A1 | 8/2006 |
| WO | 2006/125224 A2 | 11/2006 |
| WO | 2007/076952 A2 | 7/2007 |
| WO | 2009/000527 A1 | 12/2008 |
| WO | 2009/000528 A1 | 12/2008 |

OTHER PUBLICATIONS

International Search Report from Corresponding PCT Application No. PCT/EP2010/007369, dated Jun. 7, 2011 and English Translation thereof.

International Search Report from Corresponding PCT Application No. PCT/EP2010/007368, dated Jun. 8, 2011 and English Translation thereof.

International Preliminary Report on Patentability from PCT Application No. PCT/EP2010/007369, dated Jun. 5, 2012.

International Preliminary Report on Patentability from PCT Application No. PCT/EP2010/007368, dated Jul. 10, 2012.

Chinese Search Report from Application No. CN 2012800359032, Dec. 2, 2014.

Kotacka et al., "Synthetic holography at 500.000 dpi: From renaissance of portraits to holographic dust", Optical Document Security, San Francisco, Jan. 23-25, 2008, Reconnaissance International 2008, pp. 1-13.

Lee, "Micro mirror array nanostructures for anti-counterfeiting applications", Optical Security and Counterfeit Deterrence Techniques V, SPIE vol. 5310 c. 2004, pp. 350-368.

Lee, "Colourtone lithography", Mircroelectronic Engineering 61-62 (2002) pp. 105-111.

Leech et al., "Hot embossing of grating-based optically variable images in thermoplastic arcrylic lacquer", Jouran of Materials Science, Springer Science+Business Media, LLC 2007, 7 pages.

Leech et al., "Optically variable micro-mirror arrays fabricated by graytone lithography", Microelectronic Engineering, vol. 83 (2006) pp. 351-356.

Leech et al., "Printing via hot embossing of optically variable images in thermoplastic acrylic lacquer", Mircoelectronic Engineering vol. 83 (2006) pp. 1961-1965.

(56) References Cited

OTHER PUBLICATIONS

Leech et al., "Hot embossing of diffractive optically variable images in biaxially-oriented polypropylene", Mircroelectronic Engineering vol. 84 (2007) pp. 25-30.

van Renesse, "7.2.5 Volume-Reflection Holography" Optical Document Securtiy, Third Edition (2005) pp. 250-252.

Chinese Search Report from Application No. CN 2010800625972, Apr. 21, 2014.

Australian Opposition Proceeding from Application No. 20100327031, Oct. 17, 2014.

* cited by examiner

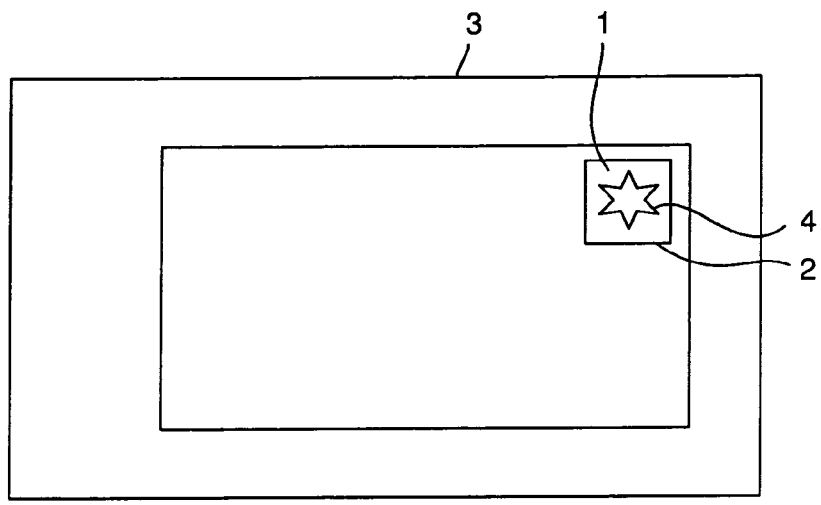
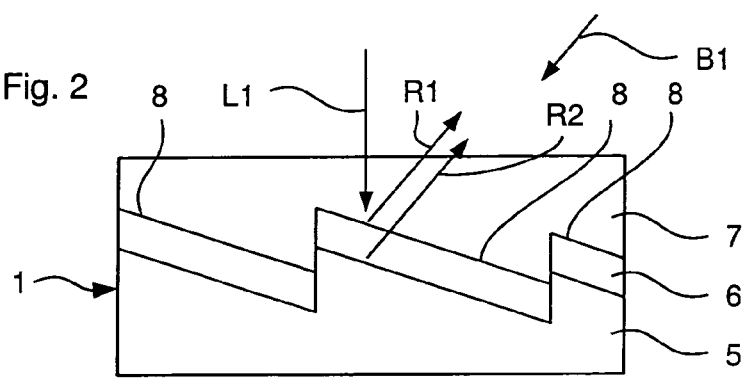
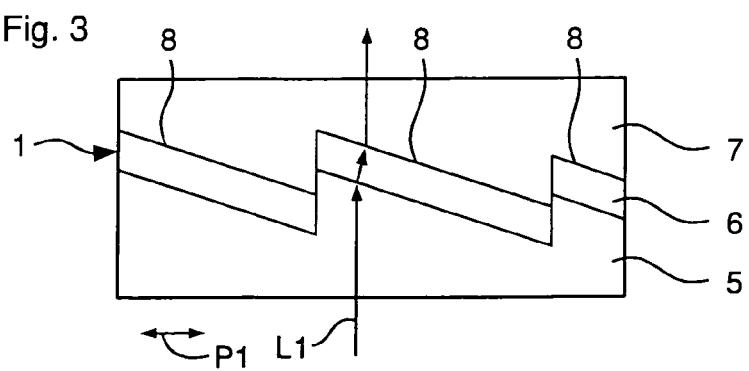

OPTICALLY VARIABLE ELEMENT, IN PARTICULAR SECURITY ELEMENT

BACKGROUND

This invention relates to an optically variable element, in particular a security element which can be employed e.g. for a data carrier.

SUMMARY

Data carriers, such as value documents and identity documents, or objects of value, such as branded articles, are often provided for safeguarding purposes with an optically variable element which permits a test of the authenticity of the data carrier and at the same time serves as protection from unauthorized reproduction. For this purpose, the optically variable element has an optical effect which for example varies upon a change of viewing direction and cannot be copied with conventional copiers.

On these premises, the invention is based on the object of specifying an optically variable element, in particular a security element, which offers high forgery-proofness along with good recognizability and easy verifiability.

This object is achieved by an optically variable element, in particular security element, having a transparent carrier layer, an at least partly transparent reflective layer which is formed on the carrier layer, and a transparent embedding layer which is formed on the reflective layer, the reflective layer being structured in a motif region such that said layer forms a multiplicity of partly transparent micromirrors which present a perceptible motif upon plan viewing of the motif region due to specular reflection of incident light, and the refractive indices of the carrier layer and of the embedding layer differing in the visible spectrum by no more than 0.2 in order that the motif perceptible in plan view is not recognizable upon transmission viewing of the motif region.

Thus, a viewer is provided with the surprising effect that he recognizes a motif in plan view but this motif disappears for him in transmission view. This optical effect can be designated as a transmissive "anti-watermark".

In the element according to the invention, the refractive indices of the carrier layer and of the embedding layer can differ in the visible spectrum by no more than 0.1, and in particular by no more than 0.05. In this case the disappearance of the motif in transmission view can be readily ensured.

Disappearance of the motif in transmission view is understood here to mean in particular that e.g. even an image located a certain distance behind the optically variable element is visible largely undistorted through the motif region while the motif perceptible in plan view is virtually no longer recognizable. The refractive effects of the partly transparent micromirrors in transmission view thus lead to no recognizability of the motif according to the invention. This is obtained through the very similar refractive indices of the carrier layer and of the embedding layer, through which the transmitted light undergoes a slight lateral offset through refraction on the partly transparent micromirrors, but the direction of propagation of the light is not, or not noticeably, changed. The motif region acts virtually like a plane-parallel plate in transmission view.

In the optically variable element, the upper side of the embedding layer facing away from the reflective layer can fail to follow the relief of the micromirrors. Particularly preferably, the upper side is of plane configuration. This leads to protection from unwanted casting and thus unwanted copying of the optically variable element. Likewise, the underside of the carrier layer facing away from the reflective layer can fail to follow the relief of the micromirrors.

Further, in the optically variable element according to the invention, the reflective layer can be a dielectric layer whose refractive index differs in at least a part of the visible spectrum by more than 0.2 from the refractive index of the carrier layer and from the refractive index of the embedding layer, respectively. Preferably, the difference can be >0.3, and particularly preferably >0.5.

The multiplicity of the partly transparent micromirrors can be so configured that at least two different motifs are presented upon plan viewing of the motif region from different viewing directions due to specular reflection of incident light.

Further, in the optically variable element according to the invention, the minimal lateral dimensions of the micromirrors can be >1 µm. Preferably, they lie in the region from 3 to 300 µm, in particular in the region from 4 to 50 µm, and particularly preferably in the region from 5 to 20 µm.

The micromirrors can form an at least locally periodic sawtooth grating or a facet grid. Further, it is possible that the reflective layer is present only in some regions and/or with a layer construction that is different in some regions.

Further, the reflection on the reflective layer can be at least reduced, preferably almost completely suppressed, in some regions by an antireflective relief, in particular a subwavelength grating or moth-eye structures.

Further, it is possible that the reflective layer has a layer thickness that is different in some regions.

The reflective layer can be formed by one or several high-refractive layer(s) having a refractive index of >1.7, preferably >1.8, and particularly preferably >2, at least in a part of the visible spectrum.

In the optically variable element according to the invention, the thickness of the reflective layer can be chosen such that the motif perceptible in plan view is presented in color due to interference of the light reflected on the boundary surfaces of the reflective layer.

In particular, the layer thickness z of the reflective layer can be chosen for a high reflectivity at a desired wavelength $\lambda$ in the visible spectral region such that the following equation $$z = \frac{(m+1/2)}{2n_R}\lambda$$

is satisfied, where m is an integral value from 1 to 4 and $n_R$ is the refractive index of the reflective layer. Preferably, the layer thickness z of the reflective layer is so chosen that the equation for z is satisfied for m=2.

In the optically variable element according to the invention, the reflective layer(s) can have in reflection a chroma $C_{ab}^* = \sqrt{a^{*2}+b^{*2}}$ of more than 40, preferably more than 50, and particularly preferably more than 60. For rating the colors or chroma there is utilized here the CIE L*a*b* color system, an illumination with a D65 standard light source being assumed.

Further, the at least one of the reflective layers can have a layer thickness in accordance with the optical path length $zn_R$ (where z is the layer thickness of the reflective layer and $n_R$ is the refractive index of the reflective layer) between 285 nm and 1755 nm, preferably between 475 nm and 1365 nm, and particularly preferably between about 500 nm and 1100 nm. When the reflective layer is formed by three layers, it is preferred that the two outer layers respectively have such an optical path length.

Further, in the optical element according to the invention, the thickness of the reflective layer can be chosen such that the motif perceptible in plan view is presented white due to interferences of the light reflected on the boundary surfaces of the reflective layer. In particular, the thickness of the reflective layer can be chosen such that the corresponding optical path length lies between 115 and 135 nm. Preferably, the optical path length amounts to 125 nm.

In the optically variable element, the reflective layer can have a three-layer construction with two outer layers and a spacer layer arranged therebetween, with the refractive indices of the outer layers being equal. In particular, the refractive indices of the outer layers can be greater than the refractive index of the spacer layer.

The optically variable element can be configured in particular as a security thread, tear thread, security band, security strip, patch or as a label for application to a data carrier, such as e.g. a security paper, value documents or the like. In particular, the optically variable element can span transparent or at least translucent regions or recesses.

The term security paper is understood here to be in particular the not yet circulable precursor to a value document, which can have besides the optically variable element according to the invention for example also further authentication features, such as e.g. luminescent substances provided within the volume. Value documents are understood here to be, on the one hand, documents manufactured from security papers. On the other hand, value documents can also be other documents or objects that can be provided with the optically variable element according to the invention in order for the value documents to have uncopiable authentication features, thereby making it possible to check authenticity and at the same time preventing unwanted copying.

There is further provided a data carrier having an optically variable element according to the invention (including its development). The data carrier can be e.g. a value document, identity document, security paper or other object of value.

There is further provided an optically variable element according to a second variant, in particular security element, having a carrier layer, a reflective layer which is formed on the carrier layer, the reflective layer having, due to its structuring, a multiplicity of micromirrors in a motif region which present a perceptible motif upon plan viewing of the motif region due to specular reflection of incident light, and the thickness of the reflective layer being so chosen that the motif perceptible in plan view is presented in color or chromatically, in particular in a single color, due to interference of the light reflected on the boundary surfaces of the reflective layer.

Such an optically variable element according to the second variant enables an excellent colored representation to be realized.

In the optically variable element according to the second variant, the layer thickness z of the reflective layer can be chosen for a desired wavelength 2 such that the following equation $$z = \frac{(m+1/2)}{2n_R}\lambda$$

is satisfied, where m is an integral value from 1 to 4 and $n_R$ is the refractive index of the reflective layer. In particular, the above equation for z can be satisfied for m=2.

The optically variable element according to the second variant can be developed in the same way as the above-described optically variable element in which the motif region also enables a transmission view. The optically variable element according to the second variant can also enable a transmission view, but it can also be configured such that no undistorted transmission view or no transmission view at all is possible.

In particular, the optically variable element according to the second variant can have a transparent embedding layer which is formed on the reflective layer.

Further, the reflective layer can be configured as a single reflective layer. However, it is also possible that the reflective layer is multilayered.

The reflective layer(s) can have in reflection a chroma $C_{ab}^* = \sqrt{a^{*2} + b^{*2}}$ of more than 40, preferably more than 50, and particularly preferably more than 60.

Further, at least one of the reflective layers can have a layer thickness in accordance with an optical path length $zn_R$ (z=layer thickness, $n_R$=refractive index of the reflective layer) between 285 nm and 1755 nm, preferably between 475 nm and 1365 nm, and particularly preferably between about 500 nm and 1100 nm. When the reflective layer is formed by three layers, the outer two will preferably have such a layer thickness in accordance with the stated optical path length.

It will be appreciated that the hereinabove mentioned features and those to be explained hereinafter can be used not only in the stated combinations, but also in other combinations or in isolation, without going beyond the scope of the present invention.

BRIEF DESCRIPTION OF THE DRAWINGS

Hereinafter the invention will be explained more closely by way of example with reference to the attached drawings, which also disclose features essential to the invention. For clarity's sake the representation in the figures is not true to scale or to proportion. There are shown:

FIG. 1 a plan view of a bank note having an optically variable element 1 according to the invention;

FIG. 2 an enlarged sectional view of the optically variable element 1 for explaining the motif presented in plan view;

FIG. 3 a sectional view of the optically variable element according to FIG. 2 for explaining the disappearance of the motif in transmission view;

DETAILED DESCRIPTION OF VARIOUS EMBODIMENTS

Figure 4:
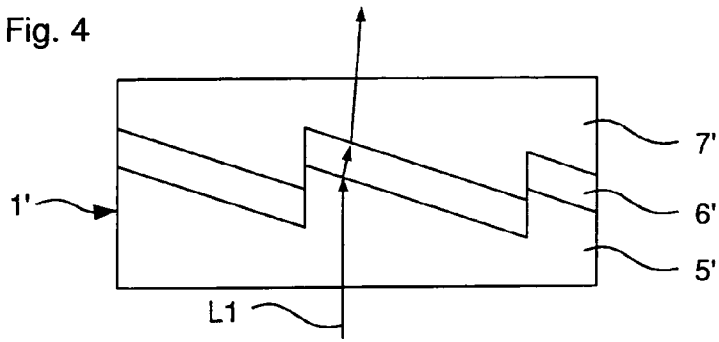
FIG. 4 a sectional view of a similar optically variable element for explaining the disappearance of the motif in transmission view in the optically variable element 1 according to the invention.

In the embodiment shown in FIG. 1, the optically variable element 1 according to the invention is arranged in a window 2 of a bank note 3 and can hence be regarded in plan view as well as in transmission view. The optically variable element 1 serves as a security element to enable the authenticity of the bank note 3 to be tested and can hence also be designated as a security feature.

As shown in the schematic representation in FIG. 1, a motif, here for example a star 4, is perceptible to a viewer in plan view. In transmission view, however, this star 4 is not visible to the viewer.

To enable this effect to be provided, the optically variable element 1, as to be seen best in the schematic sectional representation in FIG. 2, has a transparent carrier layer 5, a partly transparent reflective layer 6 as well as a transparent embedding layer 7 which are arranged one on the other in this order. The partly transparent reflective layer 6 thus lies between the transparent carrier layer 5 and the transparent embedding layer 7.

The transparent carrier layer 5, in the embodiment described here, is a transparent embossing lacquer (e.g. a thermoplastic or radiation-curing lacquer) in which the structure of a multiplicity of micromirrors 8 is embossed, this structuring being coated with the partly transparent reflective layer 6 to form the desired micromirrors 8. In the exemplary embodiment described here, a single reflective layer 6 is formed. However, it is also possible to form several transparent reflective layers one over the other.

The reflective layer 6 (or reflective layers) is (are) preferably a dielectric layer (or dielectric layers). These layers can be applied to the structured carrier layer 5 by a thin-film method, such as e.g. electron-beam vaporization or sputtering.

To minimize unwanted diffraction effects, the minimal lateral dimensions of the micromirrors 8 here are greater, and preferably considerably greater, than the maximal wavelength of the visible light. Visible light is understood here in particular to be electromagnetic radiation in the wavelength region of 380 to 780 nm. Preferably, the minimal lateral dimensions of the micromirrors 8 hence amount to at least 3 µm, preferably at least 5 µm, and particularly preferably at least 10 µm. The maximal embossing heights of the structuring in the transparent carrier layer 5 can amount to less than 20 µm, preferably less than 10 µm, and particularly preferably less than 4 µm. This makes it readily possible to embed the micromirrors 8 in a layered composite that is as thin as possible.

The micromirrors 8 can be arranged in a regular grid or also irregularly. Further, it is possible that the micromirrors 8 also form an at least locally periodic sawtooth grating.

The structuring of the carrier layer 5 and thus the arrangement of the micromirrors 8 is so chosen that a motif (here the star 4) is perceptible to a viewer in a planar motif region of the optically variable element 1 upon plan viewing of the motif region (at a viewing direction B1 and an incident light direction L1 according to FIG. 2), as indicated by the arrows R1 and R2 for the reflected light.

Because the transparent carrier layer 5 and the transparent embedding layer 7 have the same refractive index in the exemplary embodiment described here, the changes of direction through refraction of the incident light on the boundary surface between the upper side of the reflective layer 6 and the carrier layer 5, on the one hand, and on the boundary surface between the underside of the reflective layer 6 and the transparent embedding layer 7, on the other hand, cancel each other out, so that in transmission the light L1 is only horizontally offset (direction of double arrow P1). But the transmitted light ray retains its direction of propagation. Because the horizontal offset is extremely small and the direction of propagation is retained, the micromirrors 8 are practically no longer recognizable in transmission view. The security element 1 according to the invention acts in transmission view like a transparent (possibly slightly milky) window, so that a viewer can recognize e.g. a structured background through this window, but no longer sees the star 4.

FIG. 4 shows, for further explaining this transmission-view effect, an example of an optically variable element 1' in which the refractive indices of carrier and embedding layers 5', 7' are considerably different. In this case the refractions on the boundary surfaces between the reflective layer 6' and the carrier layer 5', on the one hand, and the embedding layer 7', on the other hand, cause the light to have a different direction of propagation after transmission. When a structured background is viewed through such a security element 1', the refractive effects and the resulting changes of direction lead to visible distortions, which would ultimately make the motif of the security element (here of the star 4) visible.

Hence, according to the invention, the carrier layer 5 and the embedding layer 7 are so chosen that their refractive indices are equal or differ by no more than 0.2 in the visible spectrum, because up to this difference of the refractive indices the described effect of the window in transmission view is reliably obtained.

The optically variable element 1 according to the invention thus virtually has an "anti-watermark effect", because a motif (here the star 4) is visible in plan view and the motif is no longer visible and thus disappears in transmission view. This optical effect of the optically variable element 1 according to the invention can also be designated a transmissive "anti-watermark".

In the embodiment described here, the layer thickness of the reflective layer 6 is so chosen with consideration of its refractive index that the star 4 appears in color in plan view. For this purpose, it is preferred that the refractive index of the partly transparent reflective layer 6 deviates as strongly as possible from the refractive index of the carrier layer 5. The deviation can amount to for example more than 0.2, preferably more than 0.4, and particularly preferably more than 0.6. Because embossing lacquers which can be employed for the transparent carrier layer 5 often have a refractive index of 1.5 in practice, it is easier to apply a partly transparent reflective layer 6 with a considerably higher, rather than considerably lower, refractive index. Hence, it is preferred that the refractive index of the reflective layer is at least 1.7, preferably at least 1.9, and particularly preferably greater than 2.

Hence, it is assumed for the present embodiment as well as for the subsequent embodiments that the refractive index $n_L$ of the transparent carrier layer 5 amounts to 1.5, and the refractive index $n_R$ of the partly transparent reflective layer 6 to 2.5.

The transparent embedding layer 7 has not only its function for the "anti-watermark effect" but also serves to protect from mechanical and/or chemical stress and in particular from unauthorized casting. Hence, the surface of the embedding layer 7 facing away from the reflective layer 6 is preferably of flat configuration.

As shown in the representation of FIG. 2, incident light L1 is reflected on the upper side as well as the underside of the reflective layer 6. This causes interference of the light rays reflected on the upper side and underside, so that, depending on the thickness of the reflective layer 6, white or chromatic light is reflected in the direction predetermined by the orientation of the micromirrors 8. For the sake of simplicity, perpendicular light incidence will be assumed hereinafter, whereby the described effects of course also occur at light incidence from other directions.

Constructive interference and an accordingly high reflectance of the light reflected on the boundary surfaces of the reflective layer 6 occurs when the reflected light rays have a path difference of mλ, where λ designates the wavelength of the light and m is an integer. The path difference at a thickness z of the reflective layer 6 results from twice the optical path length through the reflective layer 6 $2n_R z$ as well as a phase jump of λ/2 which occurs here on the upper boundary surface (transition from the optically thinner medium to an optically thicker one). There thus results for the constructive interference the following condition:

$$m\lambda = 2n_R z + \frac{\lambda}{2}$$

To find a layer thickness suitable for the wavelength λ one can solve the above condition for z, obtaining the following equation 1:

$$z = \frac{(m + 1/2)}{2n_R}\lambda$$

Because z must obviously be positive, it must hold that m≥0.

The fact that the reflective layer 6 has a reflection maximum at the wavelength of a certain color through constructive interference does not alone suffice to produce a representation with high chroma, however. This shall be illustrated hereinafter by calculated reflection spectra and color values. For rating the colors or chroma there is utilized here the CIE L*a*b* color system, an illumination with a D65 standard light source being assumed. The color value L* represents lightness, while a* and b* state the color location on a red-to-green and blue-to-yellow axis, respectively.

In the described embodiment, the reflective layer 6 is optimized to as high a chroma as possible in the green. For this purpose one can choose the layer thickness z in the above formula for z such that constructive interference results for example at a wavelength of 530 nm. Assuming $n_R$ 2.5, there result layer thicknesses z of 53 nm, 159 nm, 265 nm, 371 nm and 477 nm for m=0, 1, 2, 3, 4.

Figure 5:
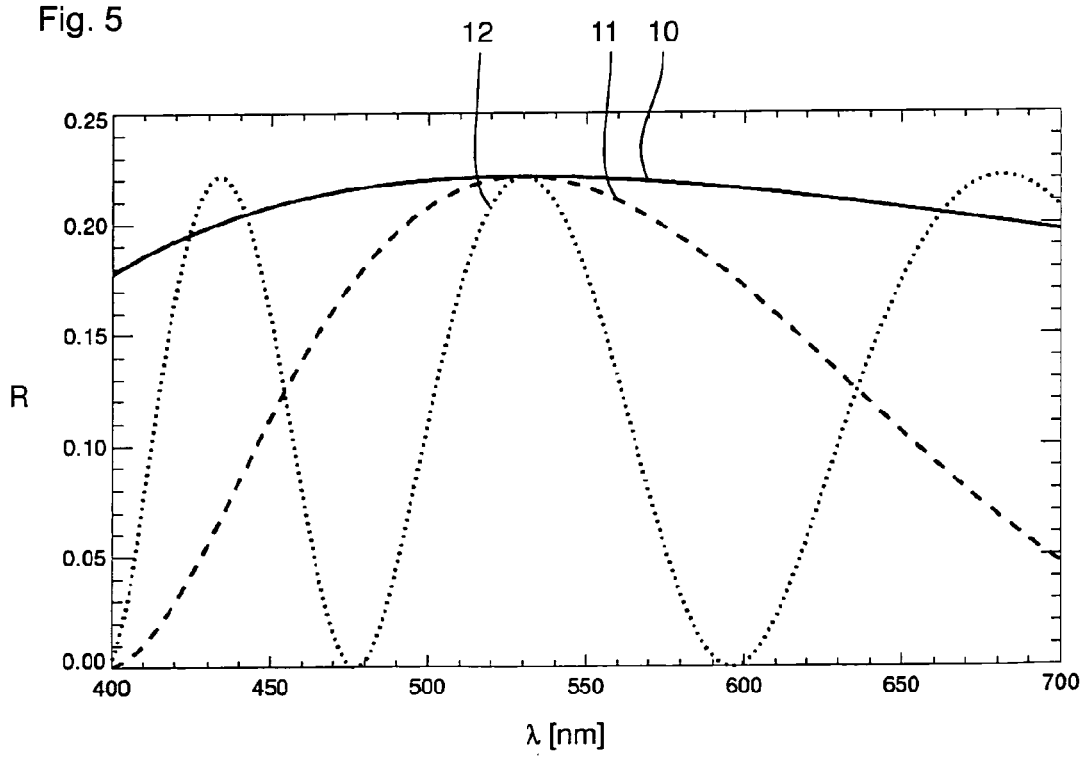
FIG. 5 the wavelength dependence of the reflectance R of the optically variable element according to FIGS. 2 and 3 for different layer thicknesses z of the reflective layer 6.

In FIG. 5 the reflectivity or reflectance R is shown along the vertical axis in dependence on the wavelength λ for the region from 400 to 700 nm (along the horizontal axis) for the layer thicknesses z of 53 nm (curve 10), 159 nm (curve 11) as well as 477 nm (curve 12). From these three reflection spectra shown by way of example it can be seen that with increasing layer thickness z of the reflective layer 6 the maximum at a wavelength of 530 nm becomes increasingly sharper, with further maxima moving into the visible spectrum (here into the represented spectrum from 400 to 700 nm) at greater layer thicknesses. Further, one can see that the value of the reflectance R at the desired wavelength of 530 nm is the same for all represented layer thicknesses z.

For quantifying the chroma, L*a*b* color values or the chroma $C_{ab}^* = \sqrt{a^{*2} + b^{*2}}$ (hereinafter also designated simply as C*) were calculated from these reflection spectra at D65 standard illumination.

Figure 6:
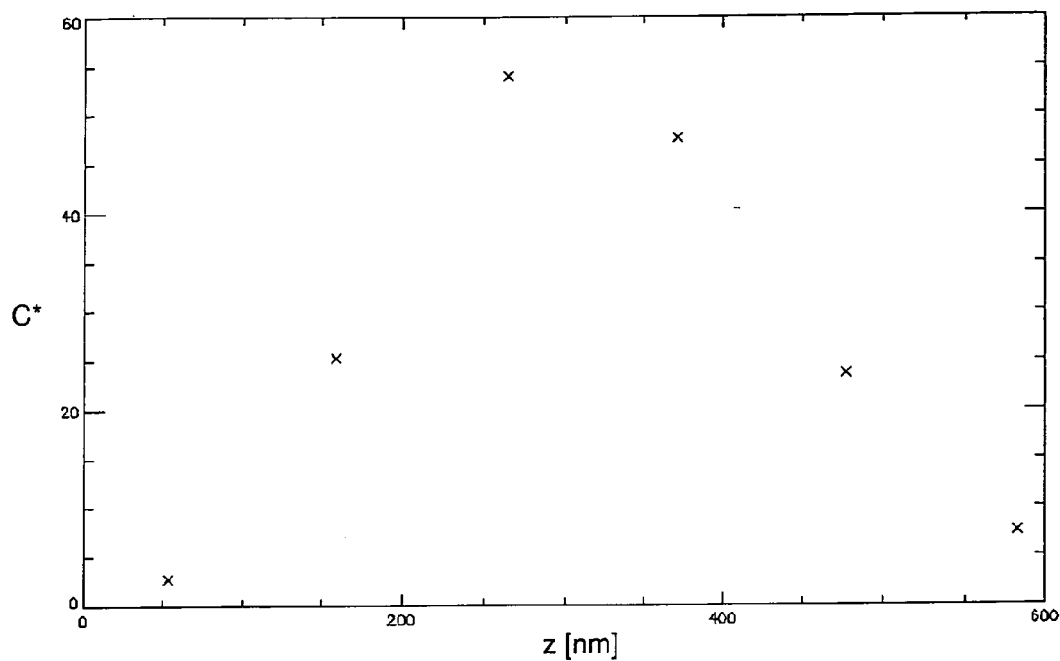
FIG. 6 a diagram on the chroma C* of the optically variable element according to FIG. 2 in dependence on the layer thickness z of the reflective layer 6 in reflection.

FIG. 6 shows the thus calculated chroma C* at reflection, the layer thickness z in nm being plotted along the horizontal axis and the chroma C* along the vertical axis. The representation of FIG. 6 indicates that the chroma C* first increases with increasing layer thickness z and then drops again at layer thicknesses corresponding to m>2. The most chromatic color is thus obtained here at m=2 or a reflective layer thickness z of 265 nm. The reason for the increase at small layer thicknesses z is the increasing sharpness of the reflection maximum shown in FIG. 5. At greater layer thicknesses z further reflection maxima, besides the desired maximum, move into the visible spectrum, which additionally deliver unwanted blue or red portions in reflection here and reduce the chroma again.

Particularly chromatic colors thus result for m between 1 and 4, in particular for m=2 and m=3. For reasons of cost, in particular the thinner layer with m=2 is of interest here. In view of the total visible spectrum between 380 nm and 780 nm, in particular those layer thicknesses z are of thus of interest here for which the equation 1 with λ between 380 nm and 780 nm and m between 1 and 4 holds. Preferably, m lies between 2 and 3. This corresponds to an optical path length $zn_R$ between 285 nm and 1755 nm, preferably between 475 nm and 1365 nm. Taking into consideration further that the human eye is rather insensitive at the edge of this spectrum, the preferred region of the optical path length can even be defined somewhat more narrowly and set approximately between 500 nm and 1100 nm.

Figure 7:
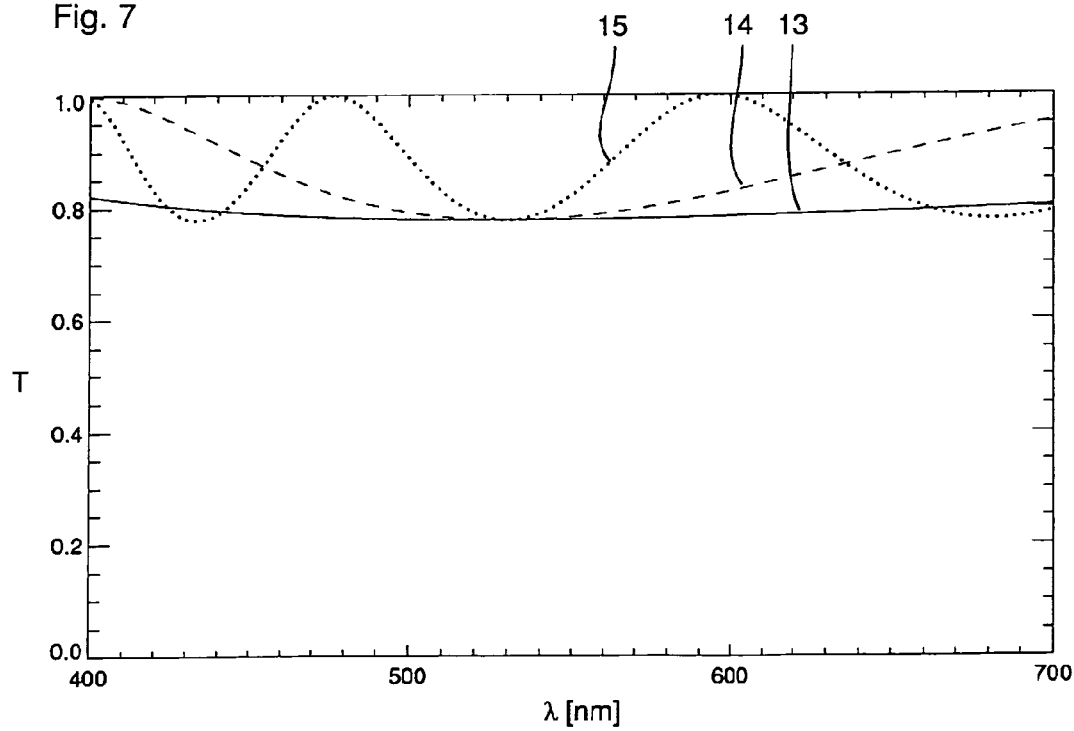
FIG. 7 a diagram of the transmittance T in dependence on the wavelength for an optically variable element according to FIG. 2 for different layer thicknesses z of the reflective layer 6.
Figure 8:
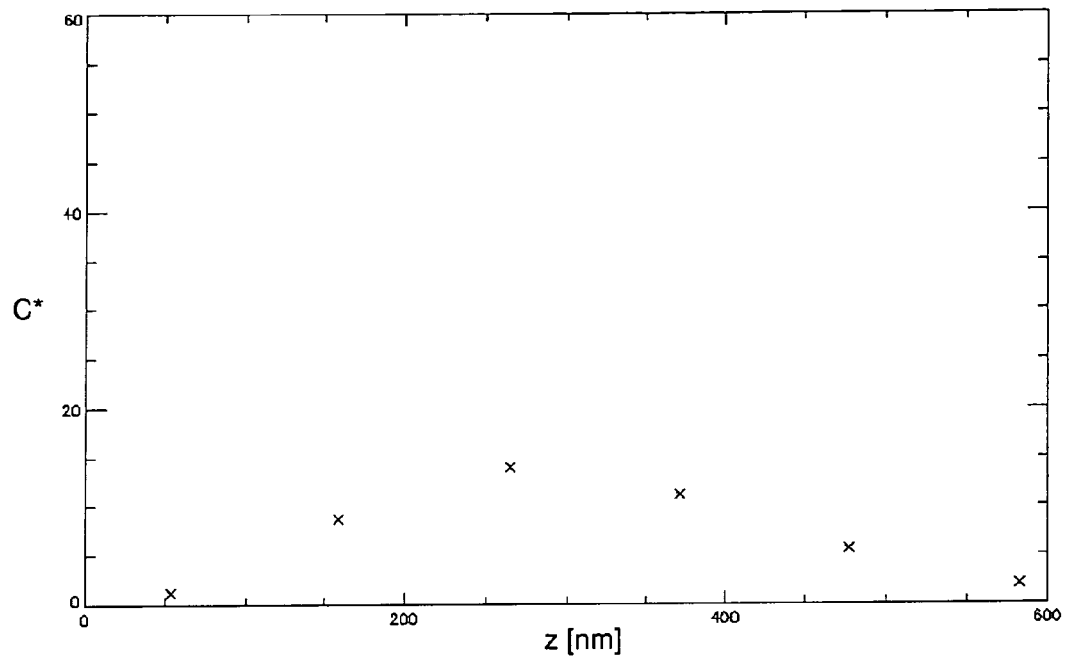
FIG. 8 a diagram for representing the chroma C* of the optically variable element of FIG. 2 in dependence on the layer thickness z of the reflective layer 6 in transmission.

In contrast to the reflection spectra shown in FIG. 5, the appurtenant transmission spectra which are represented in FIG. 7 have rather unpronounced maxima and minima. In FIG. 7 the wavelength λ of 400 to 700 nm is again plotted along the horizontal axis and the transmittance or the transmission T along the vertical axis, the curve 13 showing the transmittance for a layer thickness z of 53 nm, the curve 14 the transmittance T for a layer thickness z of 159 nm, and the curve 15 the transmittance T for a layer thickness z of 477 nm. Consequently, the reflective layer 6 is almost colorless in transmission view and appears largely like a simple transparent foil, which is indicated e.g. by the representation in FIG. 8. In FIG. 8 the chroma C* is represented in the same way as in FIG. 6, whereby the chroma is shown in transmission in FIG. 8, however, and the chroma in reflection in FIG. 6.

Because the reflective layer 6 appears like a simple transparent foil in transmission view in the motif region in the described optically variable element 1, not only does the motif (the star 4) previously seen in reflection disappear for a viewer, but the color of the foil also differs from that of the motif seen in reflection, i.e. the foil then appears largely colorless or in a different color. This is an especially striking and memorable effect for a viewer, which is very well suited for security features.

Chromaticity and lightness of the motif 4 visible in reflection can be further improved over the hitherto described embodiment with the single reflective layer by utilizing several reflective layers instead of only a single reflective layer 6.

Figure 9:
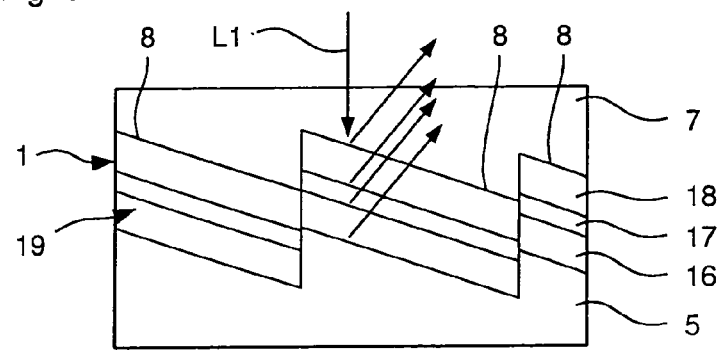
FIG. 9 a sectional view of a further embodiment of the optically variable element 1 according to the invention.

It has proved to be especially advantageous here to use threefold layers with two high-refractive layers 16 and 18 and an interjacent spacer layer 17. A schematic sectional representation of such a threefold reflective layer 19 is represented in FIG. 9.

The spacer layer 17 here can have for example a refractive index that corresponds to that of the carrier layer 5 and/or of the embedding layer 7 or is very similar thereto. In the embodiment described here, the spacer layer has a refractive index of 1.5. The thickness of the spacer layer 17 is again to be chosen such that constructive interference of the portions reflected on its upper side and on its underside occurs. By way of example a thickness of $\lambda/(4 n_L)$=88 nm is chosen here.

Figure 10:
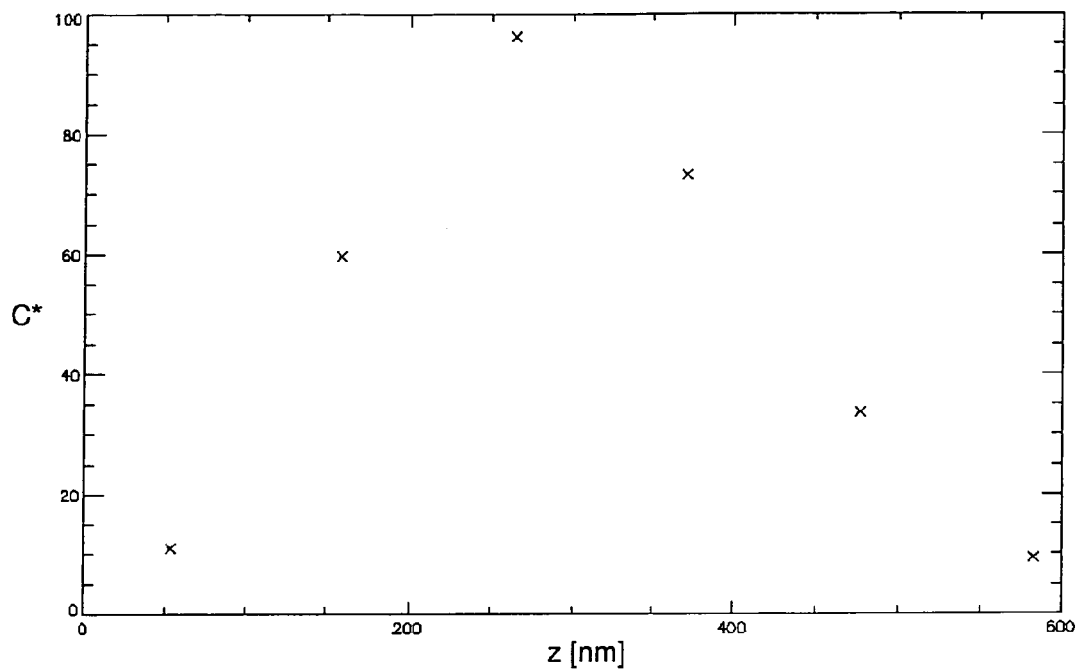
FIG. 10 a diagram of the chroma C* of the reflective layer 19 of the optically variable element according to FIG. 9 in dependence on the layer thickness z in reflection.

As indicated by FIG. 10, in which the chroma C* is shown in reflection for the embodiment of the optically variable element 1 of FIG. 9, there thus results a colorfulness or chroma that is once again considerably higher in comparison to a single reflective layer 6, lying in the optimum at over 95 (in comparison to only just below 55 with a single reflective layer 6).

In FIG. 10, in the same way as in FIG. 6, the chroma C* is plotted along the vertical axis and the layer thickness z from 0 to 600 nm along the horizontal axis, whereby z here is the layer thickness of the high-refractive layer 16 as well as of the high-refractive layer 18, which have equal layer thicknesses in the described embodiment. The layer thicknesses of the two layers 16 and 18 can of course also be different.

Figure 11:
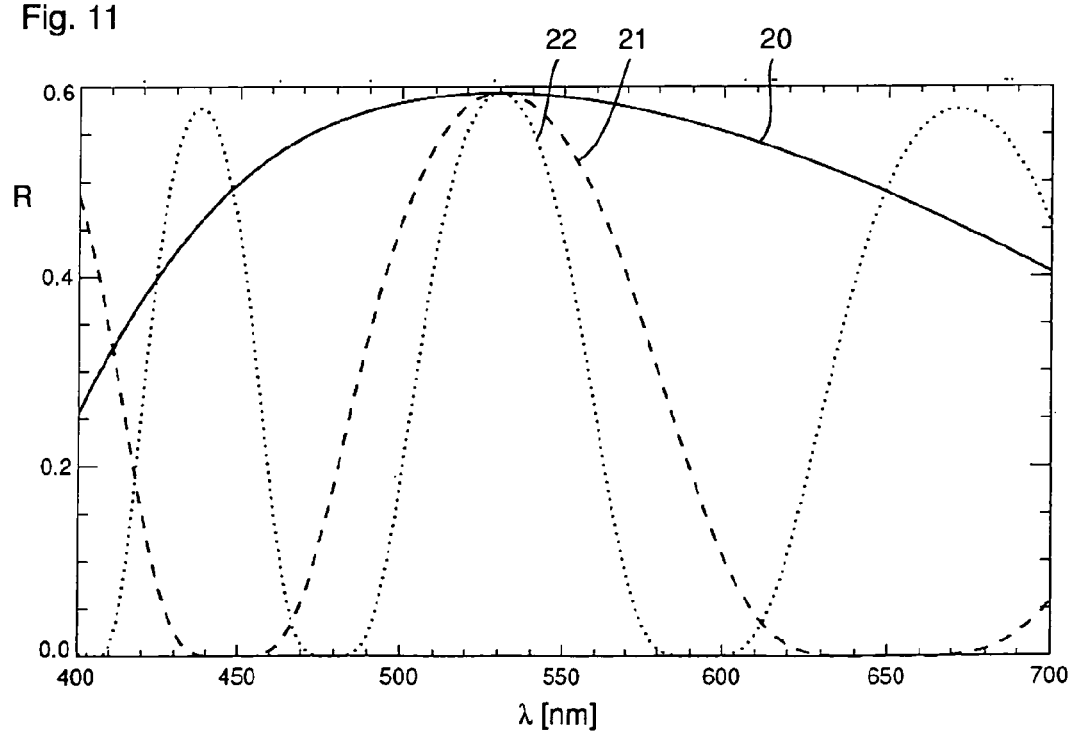
FIG. 11 a diagram of the reflectance R of the optically variable element 1 according to FIG. 9 in dependence on the wavelength for different layer thicknesses z.

The maximal reflectance R (here again for 530 nm) for the optically variable element 1 according to FIG. 9 is also once again considerably increased, now being about 0.6, as shown in FIG. 11, in comparison to about 0.22 with a single reflective layer 6 (FIG. 5). In FIG. 11 the reflectance R is plotted along the vertical axis, and the layer thicknesses z of 53 nm (curve 20), 265 nm (curve 21) and 477 nm (curve 22) of the two high-refractive layers 16 and 18 for the wavelength region from 400 to 700 nm along the horizontal axis. The spacer layer 17 has the thickness of 88 nm.

The structure of the reflective layer 19 as a threefold layer with two high-refractive layers 16 and 18 and the interjacent spacer layer 17 is thus extremely advantageous, because a considerable increase in quality over a single reflective layer 6 can be obtained with relatively little additional effort upon manufacture.

In the hitherto described embodiments, an optimization was respectively carried out with regard to the reflection in the green. This is not any restriction of course. The concept according to the invention is also transferable or applicable to other colors.

Figure 12:
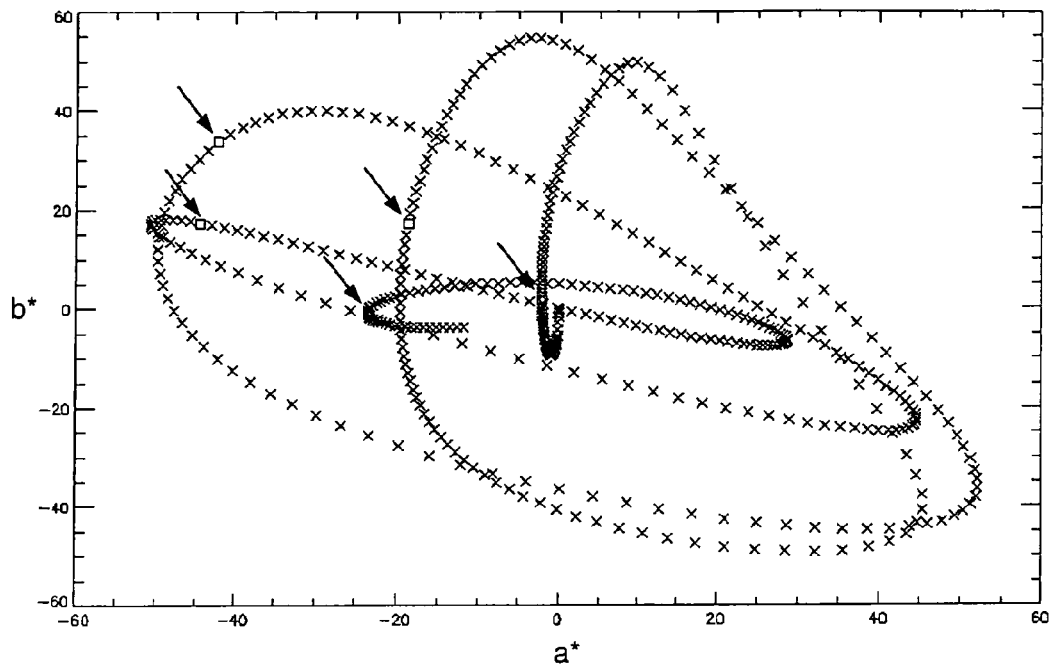
FIG. 12 a diagram for the values a* and b* of the CIE L*a*b* color system for different layer thicknesses of the reflective layer 6 according to the embodiment of FIG. 2.

Thus, in FIG. 12, for the embodiment according to FIG. 2, the values for a* are plotted along the horizontal axis and for b* along the vertical axis for layer thicknesses z of the reflective layer 6 between 0 and 500 nm in steps of 1 nm, the drawn-in arrows indicating the above-mentioned layer thicknesses z of 53 nm, 159 nm, 265 nm, 371 nm and 477 nm for a reflection maximum at 530 nm (in the green).

Figure 13:
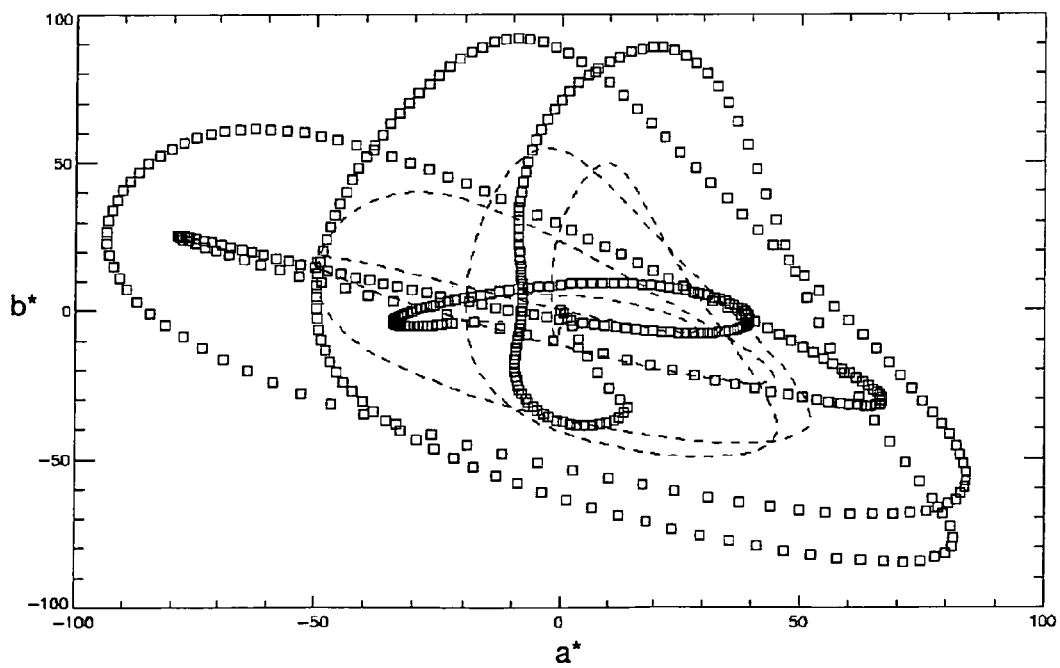
FIG. 13 a diagram for the values a* and b* of the CIE L*a*b* color system for different layer thicknesses of the reflective layer 16, 18 according to the embodiment of FIG. 9.

FIG. 13 shows a corresponding representation as in FIG. 12 for the embodiment according to FIG. 9, the spacer layer 17 having a layer thickness of 88 nm.

As indicated by the representations of FIGS. 12 and 13, colors of all color angles can be produced with high chroma. Thus, points in the direction of the positive a* axis represent red tones, points in the direction of the negative a* axis green tones, points in the direction of the positive b* axis yellow tones, and points in the direction of the negative b* axis blue tones. Therebetween there result corresponding mixed colors. For optimizing a certain color tone, the thickness of the spacer layer 17 can further be optimized.

At this point it should be noted that the colors visible in plan view can also depend on the angle of reflection and have a shift effect. High-refractive reflective layers show lower color shift than low-refractive reflective layers. Depending on the application, a clear color-shift effect may be wanted or unwanted. The refractive index of the reflective layer can be chosen in dependence thereon, for example.

Figure 14:
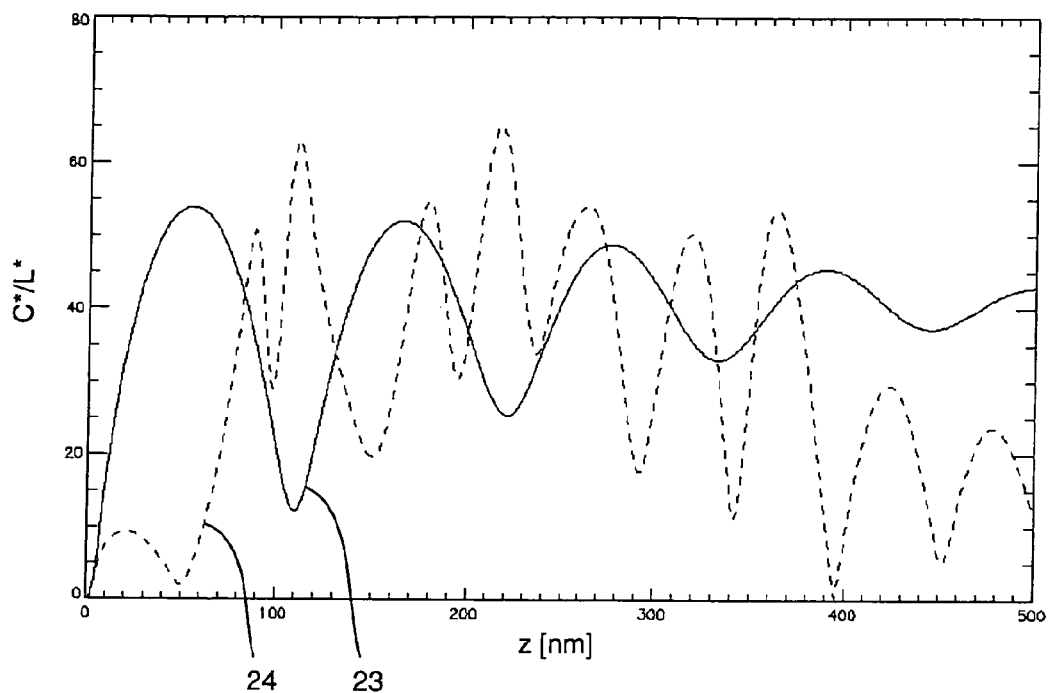
FIG. 14 a diagram of the lightness L* and the chroma C* upon reflection in dependence on the layer thickness z of the reflective layer 6 for the optically variable element according to FIG. 2, and FIG. 15 a sectional view of a further embodiment of the optically variable element 1 according to the invention.

Further, the layer thickness of the reflective layer 6 can also be optimized in terms of a representation as white as possible, rather than in terms of an especially chromatic representation. In FIG. 14 there is represented, for the embodiment of the optically variable element 1 according to FIG. 2, the lightness L* (curve 23) along the vertical axis, and the chroma C* (curve 24) at reflection in dependence on the layer thickness z from 0 to 500 nm along the horizontal direction. A layer thickness z of 50 nm is especially advantageous. Here there is great lightness at very low chroma, which in practice causes very light, white representations. This layer thickness corresponds approximately to an optical path length $n_R z$ of about 125 nm. Thus, according to the above formula, with m=0, a wide maximum is present at about 500 nm, i.e. in the middle of the visible spectrum. In general, particularly light, white representations can thus be obtained with layer thicknesses in accordance with an optical path length $n_R z$ around 125 nm.

Through the employment of two reflective layers 16 and 18 with a thickness of about 50 nm and a refractive index of 2.5, which are separated by a spacer layer 17 with a refractive index of 1.5 and a thickness of 88 nm, the lightness can also be once again considerably increased in a structure according to FIG. 9 (reflective layer 19 with three-layer construction).

The partly transparent reflective layer 6 as well as the high-refractive layers 16 and 18 can be realized in particular by high-refractive dielectrics, such as e.g. $TiO_2$ or ZnS For the spacer layer 17 with a lower refractive index there can be employed for example $SiO_2$ or $MgF_2$.

For the optical effect, primarily the differences in refractive index are significant and not so much the absolute values. Instead of high-refractive reflective layers 6, 16, 18 in a low-refractive lacquer 5, 7, there can in principle also be utilized low-refractive reflective layers in high-refractive lacquers. Thus, the prior art discloses in particular lacquers with a refractive index of 1.8 which could be coated for example with a reflective layer of $MgF_2$. The spacer layer could then be a high-refractive layer of for example ZnS. Furthermore, dielectric polymers can also be used as a reflective layer(s) or spacer layer(s).

Further, the micromirrors 8 can be coated with different reflective layers in some regions. In particular, the reflective layers can be left out and/or be present in different layer thickness in some regions. This makes it possible to realize in particular also multicolor views and/or a change between views with different colors. One way of realizing reflective layers differing in some regions is to use washing methods by which for example a washing ink is first printed on the embossing lacquers, or on lower reflective layers that might already be present, the reflective layer is then vapor-deposited over the full area, and the washing ink is subsequently washed off again, thereby likewise removing the coating on the regions previously covered with the washing ink.

The optically variable element 1 according to the invention can show a multiplicity of different optical effects. The optical effects can contain for example a 3D bulge, a 3D stereogram, (multi-)shift images and/or kinematic effects.

Figure 15:
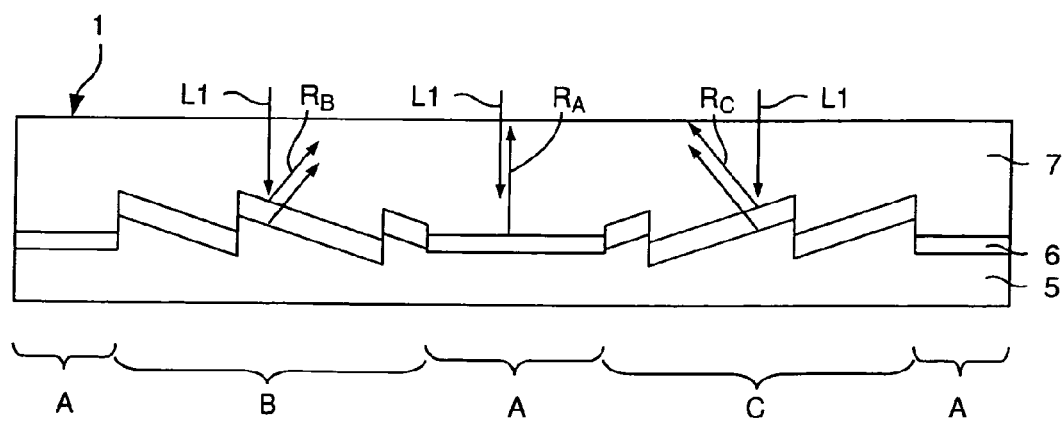

FIG. 15 shows a sectional representation of an embodiment of the optically variable element 1, in which the element 1 has three regions A, B and C. In each of these regions there are located micromirrors 8 which reflect incident light L1 in respectively predetermined directions $R_A$, $R_B$ and $R_C$. At perpendicularly incident light L1 the regions A, B and C respectively light up brightly in the color given by the reflective layer 6 from the appurtenant viewing direction $R_A$-$R_C$. This makes it possible e.g. for different motifs to be perceived from the different viewing directions $R_A$-$R_C$. The regions A-C can be mutually interlaced.

In order for arbitrary motifs to be representable such that no negative image becomes visible in plan view from certain directions, the reflective layer 6 can for example be left out in some regions. As an alternative to leaving out parts of the reflective layer 6, an antireflection structure (not shown), in particular subwavelength grating or moth-eye structures, can be embossed, instead of the micromirrors 8, in regions that are not to light up brightly in plan view from any of the possible viewing directions $R_A$-$R_C$. Such a method is especially advantageous, because no additional working steps are necessary for leaving out parts of the reflective layer, and antireflection structures can be embossed with high resolution in exact register beside micromirrors 8 in the same working operation.

The optically variable element according to the invention can be used in particular in a transparent region of a value document, in particular a bank note. Alternatively, it can also be placed on a light or dark background, however. Against a dark background the representations appear especially light and rich in contrast in plan view. Because a dark background cannot be integrated into every bank-note design, however, the optically variable element 1 can be configured such that the motif is perceptible so light in plan view that it is still sufficiently striking against a background that is white or printed with an arbitrary motif.

The optically variable element 1 according to the invention can also be configured as a security thread. Further, it is possible to configure the optically variable element 1 directly on the value document. Thus, there can be carried out a direct printing with subsequent embossing of the optically variable element 1 onto a polymer substrate to configure a security element according to the invention on plastic bank notes, for example. The optically variable element 1 according to the invention can be configured in a great variety of substrates. In particular, it can be configured in or on a paper substrate, a paper with synthetic fibers, i.e. paper with a share x of polymeric material in the range of 0<x<100 wt. %, a plastic foil, e.g. a foil of polyethylene (PE), polyethylene terephthalate (PET), polybutylene terephthalate (PBT), polyethylene naphthalate (PEN), polypropylene (PP) or polyamide (PA), or a multilayer composite, in particular a composite of several different foils (compound composite) or a paper/foil composite (foil/paper/foil or paper/foil/paper), whereby the optically variable element can be provided in or on or between each of the layers of such a multilayer composite.

LIST OF REFERENCE SIGNS

1 Optically variable element
2 Window
3 Bank note
4 Star
5 Transparent carrier layer
6 Partly transparent reflective layer
7 Transparent embedding layer
8 Micromirrors
10-15 Curve
16 High-refractive layer
17 Spacer layer
18 High-refractive layer
19 Reflective layer
20-24 Curve
L1 Incident light
R1, R2 Reflected light
B1 Viewing direction
P1 Double arrow
R Reflectance
T Transmittance
A, B, C Region
$R_A$, $R_B$, $R_C$ Direction

The invention claimed is:

1. An optically variable element having
a transparent carrier layer;
an at least partly transparent reflective layer which is formed on the carrier layer; and
a transparent embedding layer which is formed on the reflective layer;
wherein the reflective layer is structured in a motif region such that said layer forms a multiplicity of partly transparent micromirrors which present a perceptible motif upon plan viewing of the motif region due to specular reflection of incident light; and
wherein the refractive indices of the carrier layer and of the embedding layer differ in the visible spectrum by no more than 0.2 in order that the motif perceptible in plan view is not recognizable upon transmission viewing of the motif region wherein the reflective layer is a dielectric layer whose refractive index differs in at least a part of the visible spectrum by more than 0.2 from the refractive index of the carrier layer and from the refractive index of the embedding layer, respectively.

2. The element according to claim 1, wherein the refractive indices of the carrier layer and of the embedding layer differ in the visible spectrum by no more than 0.1.

3. The element according to claim 1, wherein the upper side of the embedding layer facing away from the reflective layer does not follow the relief of the micromirrors.

4. The element according to claim 1, wherein the refractive index of the reflective layer differs in at least a part of the visible spectrum by more than 0.3, and by more than 0.5, from the refractive index of the carrier layer and from the refractive index of the embedding layer, respectively.

5. The element according to claim 1, wherein the multiplicity of partly transparent micromirrors is so configured that at least two different motifs are presented upon plan viewing of the motif region from different viewing directions due to specular reflection of incident light.

6. The element according to claim 1, wherein the minimal lateral dimensions of the micromirrors are greater than 1 μm.

7. The element according to claim 1, wherein the thickness of the reflective layer is so chosen that the motif perceptible in plan view is presented in color due to interference of the light reflected on the boundary surfaces of the reflective layer.

8. The element according to claim 1, wherein the layer thickness z of the reflective layer is chosen for a desired wavelength λ such that the following equation $$z = \frac{(m+1/2)}{2n_R}\lambda$$

is satisfied, where m is an integral value from 1 to 4 and $n_R$ is the refractive index of the reflective layer.

9. The element according to claim 8, wherein the above equation for z is satisfied for m=2.

10. The element according to claim 7, wherein the reflective layer has in reflection a chroma $C_{ab}^* = \sqrt{a^{*2}+b^{*2}}$ of more than 40.

11. The element according to claim 7, wherein the reflective layer has a layer thickness in accordance with an optical path length between 285 nm and 1755 nm.

12. The element according to claim 7, wherein the reflective layer is formed by three layers, the outer two of which respectively have a layer thickness in accordance with an optical path length between 285 nm and 1755 nm.

13. The element according to claim 1, wherein the reflective layer is formed by one or several high-refractive dielectric layer(s) having a refractive index of >1.7.

14. The element according to claim 1, wherein the thickness of the reflective layer is so chosen that the motif perceptible in plan view is presented white due to interferences of the light reflected on the boundary surfaces of the reflective layer.

15. The element according to claim 14, wherein the thickness of the reflective layer is so chosen that the corresponding optical path length lies between 115 and 135 nm.

16. The element according to claim 1, wherein the reflective layer has a three-layer construction with two outer layers and a spacer layer arranged therebetween, with the refractive indices of the outer layers being equal.

17. The optical element according to claim 16, wherein the refractive indices of the outer layers are greater than the refractive index of the spacer layer.

18. A data carrier having an optically variable element according to claim 1.

\* \* \* \* \*